(12) United States Patent
Kunisawa et al.

(10) Patent No.: US 10,316,164 B2
(45) Date of Patent: Jun. 11, 2019

(54) TIRE

(71) Applicant: SUMITOMO RUBBER INDUSTRIES, LTD., Kobe-shi, Hyogo (JP)

(72) Inventors: Tetsuya Kunisawa, Kobe (JP); Yuka Yokoyama, Kobe (JP)

(73) Assignee: SUMITOMO RUBBER INDUSTRIES, LTD, Kobe-Shi, Hyogo (JP)

( * ) Notice: Subject to any disclaimer, the term of this patent is extended or adjusted under 35 U.S.C. 154(b) by 339 days.

(21) Appl. No.: 14/933,728

(22) Filed: Nov. 5, 2015

(65) Prior Publication Data

US 2016/0152792 A1   Jun. 2, 2016

(30) Foreign Application Priority Data

Dec. 1, 2014   (JP) .................. 2014-243410

(51) Int. Cl.
*B60C 1/00* (2006.01)
*C08K 3/36* (2006.01)
*C08L 21/00* (2006.01)

(52) U.S. Cl.
CPC .............. *C08K 3/36* (2013.01); *B60C 1/0008* (2013.01); *C08L 21/00* (2013.01)

(58) Field of Classification Search
CPC .................. C08L 21/00; C08K 3/36
See application file for complete search history.

(56) References Cited

U.S. PATENT DOCUMENTS

| 7,863,371 | B2 | 1/2011 | Hirayama et al. |
| 8,058,339 | B2 | 11/2011 | Taguchi et al. |
| 8,158,705 | B2 | 4/2012 | Sugimoto |
| 2006/0223917 | A1* | 10/2006 | Hergenrother ........ B60C 1/0016 524/80 |
| 2010/0041815 | A1 | 2/2010 | Miyazaki |
| 2014/0102611 | A1 | 4/2014 | Miyazaki |

FOREIGN PATENT DOCUMENTS

| EP | 1 798 257 A1 | 6/2007 |
| EP | 2 147 951 A1 | 1/2010 |
| EP | 2 377 693 A1 | 10/2011 |
| JP | 2006-249147 A | 9/2006 |
| JP | 2008-297462 A | 12/2008 |
| JP | 2011-57788 A | 3/2011 |
| WO | WO 2013/031240 A1 | 3/2013 |

OTHER PUBLICATIONS

Office Action issued in Japanese Patent Application No. 2014-243410, dated Dec. 20, 2016, with an English translation-in-part thereof.
Search Report dated Sep. 16, 2016, issued in Russian Patent Application No. 2015147644/11(073358), with English translation.

* cited by examiner

*Primary Examiner* — Peter D. Mulcahy
(74) *Attorney, Agent, or Firm* — Birch, Stewart, Kolasch & Birch, LLP

(57) ABSTRACT

The tire of the present invention is a tire having an inner liner composed of a rubber composition for an inner liner which is excellent in steering stability, fuel efficiency and a balance of physical properties while maintaining air permeation resistance and durability. The rubber composition for an inner liner comprises a rubber component and additives, wherein $E^*$ (MPa) and tan δ measured at a temperature of 70° C., an initial strain of 10% and a dynamic strain of 2% satisfy the following formulas (1) to (3), an air permeation coefficient is not more than $12.00 \times 10^{-14}$ cm$^3$·cm/(cm$^2$·s·Pa), and TB (MPa) and EB (%) as measured in accordance with JIS K6251 satisfy the following formulas (4) and (5).

| $E^*/\tan \delta > 17$ | Formula (1): |
| $2.5 < E^* < 5$ | Formula (2): |
| $\tan \delta < 0.15$ | Formula (3): |
| $EB > 450$ | Formula (4): |
| $TB \times EB > 10,000$ | Formula (5): |

8 Claims, No Drawings

TIRE

TECHNICAL FIELD

The present invention relates to a tire having an inner liner composed of a predetermined rubber composition for an inner liner.

BACKGROUND OF THE INVENTION

In recent years, a requirement for a reduction of fuel consumption of a tire has been getting higher and the reduction of fuel consumption is also required to an inner liner which is arranged inside a tire and has a function of decreasing the amount of air leaked to the outside from the inside of a pneumatic tire and improving air permeation resistance.

Traditionally, a rubber composition for an inner liner has improved its air permeation resistance by using a rubber composition comprising a rubber component mainly composed of a butyl-based rubber. However, the rubber composition comprising a large amount of a butyl-based rubber has a problem of lowered fuel efficiency and lowered adhesive property to other components.

In JP 2011-057788 A, a technique of making a thickness of an inner liner thinner by using an inner liner using a polymer composition mainly composed of a polymer mixture comprising a thermoplastic resin which has better air permeation resistance than that of a butyl-based rubber, and thereby attempting improvement of fuel efficiency by weight saving of a tire. However, since the inner liner mainly composed of a resin generally has a small elongation at break and the physical properties thereof are widely different from those of other tire components which are mainly composed of a rubber component, there is a problem of deteriorated processability and adhesive property to adjacent components and there is also a problem in flexing crack growth resistance.

In JP 2006-249147 A and JP 2008-297462 A, an environment-friendly inner liner which has improved processability and flexing crack growth resistance by using a rubber composition mainly composed of a natural rubber for an inner liner to decrease a used amount of oil resources is described but there is room for improvement with respect to fuel efficiency.

SUMMARY OF THE INVENTION

An object of the present invention is to provide a tire having an inner liner composed of a rubber composition for an inner liner which is excellent in steering stability, fuel efficiency and a balance of physical properties while maintaining air permeation resistance and durability.

The present invention relates to a tire having an inner liner composed of a rubber composition for an inner liner comprising a rubber component and additives, wherein a dynamic elastic modulus $E^*$ (MPa) and a loss tangent $\tan \delta$ measured at a temperature of 70° C., an initial strain of 10% and a dynamic strain of 2% satisfy the following formulas (1) to (3), an air permeation coefficient is not more than $12.00 \times 10^{-14}$ cm$^3$·cm/(cm$^2$·s·Pa), and a tensile strength at break TB (MPa) and an elongation at break EB (%) as measured in accordance with JIS K6251 satisfy the following formulas (4) and (5).

$E^*/\tan \delta > 17$  Formula (1):

$2.5 < E^* < 5$  Formula (2):

$\tan \delta < 0.15$  Formula (3):

$EB > 450$  Formula (4):

$TB \times EB > 10{,}000$  Formula (5):

It is preferable that the rubber composition has a rubber hardness Hs at 23° C. as measured in accordance with the JIS-K6253 type A method of not more than 60.

It is preferable that the additives comprise silica.

It is preferable that the additives comprise n (n is an integer of 2 or more) kinds of silica and a content and a BET specific surface area of the silica satisfy the following formulas (6) and (7):

$10 < X1+X2+ \ldots +Xn < 40$  Formula (6):

$0.20 < X1/Y1+X2/Y2+ \ldots +Xn/Yn < 0.30,$  Formula (7):

wherein each of X1, X2, ... Xn represents a content (part by mass) of each silica based on 100 parts by mass of a rubber component and each of Y1, Y2, ... Yn represents a BET specific surface area (m$^2$/g) of each silica.

It is preferable that the rubber component substantially comprises no butyl-based rubber.

It is preferable that the additives substantially comprise no aroma oil and mineral oil.

It is preferable that the rubber component comprises 50% by mass or more of a diene rubber having a functional group that has affinity with silica in its main chain.

It is preferable that the additives comprise benzothiazolyl sulfenimides.

According to the present invention, it is possible to provide a tire having an inner liner composed of a rubber composition for an inner liner which is excellent in steering stability, fuel efficiency and a balance of physical properties while maintaining air permeation resistance and durability, by using a tire having an inner liner composed of a rubber composition for an inner liner comprising a rubber component and additives, wherein a dynamic elastic modulus $E^*$ (MPa) and a loss tangent $\tan \delta$ measured at a temperature of 70° C., an initial strain of 10% and a dynamic strain of 2% satisfy the predetermined formulas, an air permeation coefficient is within a predetermined range, and a tensile strength at break TB (MPa) and an elongation at break EB (%) as measured in accordance with JIS K6251 satisfy predetermined formulas.

DETAILED DESCRIPTION

The tire of the present invention has an inner liner composed of a rubber composition for an inner liner comprising a rubber component and additives, wherein a dynamic elastic modulus $E^*$ (MPa) and a loss tangent $\tan \delta$ measured at a temperature of 70° C., an initial strain of 10% and a dynamic strain of 2% satisfy the predetermined formulas, an air permeation coefficient is within a predetermined range, and a tensile strength at break TB (MPa) and an elongation at break EB (%) as measured in accordance with JIS K6251 satisfy predetermined formulas.

The rubber composition for an inner liner of the present invention is characterized in that a dynamic elastic modulus $E^*$ (MPa) and a loss tangent $\tan \delta$ measured at a temperature of 70° C., an initial strain of 10% and a dynamic strain of 2% satisfy the following formulas (1) to (3).

$E^*/\tan \delta > 17$  Formula (1):

$2.5 < E^* < 5$  Formula (2):

$\tan \delta < 0.15$  Formula (3):

While the inner liner is subjected to various operating temperatures from 0° C. or less to near 100° C. depending on an external environment and a running time, generally, a temperature during running tends to be around 70° C. Since following property of the inner liner to other components of the tire comprising no butyl-based rubber has low temperature dependence, both a rubber physical property of good following property toward the other components of the tire and improved fuel efficiency can be achieved by a dynamic elastic modulus E* (MPa) and a loss tangent tan δ measured at a temperature of 70° C., an initial strain of 10% and a dynamic strain of 2% satisfying the above formulas (1) to (3).

The E* in the specification of the instant application refers to a dynamic elastic modulus at elongation measured with a viscoelastic spectrometer under a condition of a temperature of 70° C., an initial strain of 10% and a dynamic strain of 2%. Since the dynamic elastic modulus E* exerts a stress against a periodically given deformation, the larger the value of E* is, the better the rubber elasticity is and the better the rubber physical property of following property toward other components of the tire is. Further, the tan δ in the specification of the instant application refers to a loss tangent at elongation measured with a viscoelastic spectrometer under a condition of a temperature of 70° C., an initial strain of 10% and a dynamic strain of 2%. The loss tangent tan δ represents a magnitude of energy consumed in a process during which a deformation is applied and this consumed energy converts into heat. That is, the smaller the value of tan δ is, the more excellent the low heat build-up property and fuel efficiency are. Therefore, the larger the value of E*/tan δ in the formula (1) is, the more excellent both the rubber physical property and fuel efficiency are.

The E*/tan δ in the formula (1) exceeds 17 and is preferably not less than 18. By the E*/tan δ satisfying the formula (1), both an excellent rubber physical property and excellent fuel efficiency can be achieved.

The E* in the formula (2) exceeds 2.5 MPa and preferably is not less than 2.6 MPa. On the other hand, the E* is less than 5 MPa and preferably is not more than 4.9 MPa. The rubber physical property of satisfactory and uniform processability can be obtained when the E* is within the above range. Consequently a balance of physical properties between the inner liner and adjacent components becomes good and the inner liner having good following property toward other components of the tire can be obtained, thereby improving steering property and durability of the tire.

The tan δ in the formula (3) is less than 0.150 and preferably not more than 0.145, more preferably not more than 0.140. The lower limit of the tan δ is not limited particularly. Excellent energy efficiency can be obtained when the tan δ is within the above range.

As described above, the rubber composition for an inner liner of the present invention can achieve both a rubber physical property of satisfactory following property toward the other components of the tire and excellent energy efficiency, by satisfying the formulas (1) to (3).

Moreover, since the rubber composition for an inner liner of the present invention is used for an inner liner which is formed to be an inner cavity surface of the tire and performs a function of maintaining an inner pressure of the tire by reducing air permeation, excellent air permeation resistance is required.

Since excellent air permeation resistance required for the inner liner can be obtained, an air permeation coefficient of the rubber composition is not more than $12.00 \times 10^{-14}$ cm$^3$·cm/(cm$^2$·s·Pa) and preferably not more than $11.70 \times 10^{-14}$ cm$^3$·cm/(cm$^2$·s·Pa).

The rubber composition for an inner liner of the present invention is further characterized in that an elongation at break EB (%) and a tensile strength at break TB (MPa) as measured in accordance with JIS K6251 satisfy the following formulas (4) and (5). Thereby, a rubber composition having excellent breaking resistance (durability) can be obtained.

$$EB > 450 \qquad \text{Formula (4):}$$

$$TB \times EB > 10{,}000 \qquad \text{Formula (5):}$$

The EB in the specification of the instant application refers to an elongation at break as measured in accordance with JIS K6251. The elongation at break EB represents an elongation ratio (%) when a sample is stretched to be broken and the greater the value of the EB is, the more excellent the fatigue resistance is.

The EB exceeds 450%, which satisfies the formula (4), and preferably not less than 500%, more preferably not less than 550%. If the EB is not more than 450%, fatigue resistance tends not to be obtained sufficiently. The upper limit of the EB is not limited particularly.

The TB in the specification of the instant application refers to a tensile strength at break as measured in accordance with JIS K6251. The tensile strength at break TB represents a force (MPa) required for stretching and breaking the sample and the greater the value of the TB is, the more excellent the breaking resistance strength is.

The TB×EB exceeds 10,000, which satisfies the formula (5), and preferably 10,500, more preferably 11,000. When the TB×EB is not more than 10,000, sufficient breaking resistance tends not to be obtained. The upper limit of TB×EB is not limited particularly.

As described above, the rubber composition for an inner liner of the present invention exhibits excellent breaking resistance (durability) by satisfying the formulas (4) and (5).

The rubber hardness Hs of the rubber composition for an inner liner of the present invention is preferably not less than 30, more preferably not less than 35, further preferably not less than 40, from the viewpoint of processability and steering property. On the other hand, the Hs is preferably not more than 60, more preferably not more than 55, further preferably not more than 50, from the viewpoint of flexing crack growth resistance and fatigue resistance. It is noted that the rubber hardness Hs of the rubber composition in the specification of the instant application is a JIS-A hardness and is a value as measured under an environment of 23° C. in accordance with JIS K6253.

The rubber composition for an inner liner of the present invention comprises a rubber component and additives.

The ones generally used in the tire industry can be used as the rubber component and examples thereof include a diene rubber such as a natural rubber (NR), an isoprene rubber (IR), a butadiene rubber (BR) and a styrene butadiene rubber (SBR), and a butyl-based rubber such as a butyl rubber (IIR) and a halogenated butyl rubber. These rubber components may be used alone, or may be used in combination with two or more thereof.

However, it is preferable that the rubber composition for an inner liner substantially comprises no butyl-based rubber as a rubber component and it is more preferable that the rubber composition for an inner liner comprises no butyl-based rubber (0 part by mass). The meaning of to substantially comprise no butyl-based rubber is that the content of a butyl-based rubber in the rubber component is not more than 20% by mass. As described above, while a butyl-based rubber is extremely excellent in air permeation resistance, there is a problem that it is inferior in energy efficiency and adhesive property to adjacent components. On the other hand, the rubber composition for an inner liner of the present invention can obtain air permeation resistance required for the inner liner and since adhesive property to adjacent components and a balance of physical properties are excellent, the inner liner is hardly peeled and additionally, since following property at the time where a tire is flexed is also excellent, steering property is also improved.

It is preferable that the rubber composition for an inner liner comprises a diene rubber having a functional group that has affinity with silica in its main chain as the diene rubber from the viewpoint of energy efficiency and adhesive property to adjacent components.

Examples of the functional group that has affinity with silica include an epoxy group, a silyl group, an amino group, a hydroxyl group, a carboxyl group, an amide group, a mercapto group and the like. From the viewpoint of affinity with silica and easiness of control of an introduction to a polymer, an epoxy group, a silyl group and an amino group are more preferable and an epoxy group is particularly preferable.

Diene rubbers having an epoxy group (epoxydized diene rubber) are preferable as the diene rubber having a functional group that has affinity with silica in its main chain and among them, an epoxidized natural rubber (ENR) and an epoxydized butadiene rubber (EBR) are preferable and from the viewpoint of concern for the environment and air permeation resistance, the ENR is more preferable.

The epoxidation rate of an epoxidized diene rubber is preferably not more than 50 mol %, more preferably not more than 30 mol %. On the other hand, the epoxidation rate is preferably not less than 1 mol %, more preferably not less than 2 mol %. If the epoxidation rate is within the above range, both excellent energy efficiency and satisfactory rubber strength can be highly achieved.

When the rubber composition for an inner liner comprises a diene rubber having a functional group that has affinity with silica in its main chain, the content thereof in the rubber component is preferably not less than 50% by mass, more preferably not less than 60% by mass, further preferably not less than 75% by mass, most preferably 100% by mass.

Examples of the additives include a reinforcing filler, a coupling agent, a semi-reinforcing filler, a zinc oxide, a stearic acid, various anti-aging agents, a plasticizer, wax, a vulcanization agent such as sulfur, various vulcanization accelerators and the like, which are generally used in the tire industry and can be compounded appropriately.

Examples of the reinforcing filler include silica, carbon black and the like and these may be used alone, or may be used in combination with two or more thereof. Among these, it is preferable that the rubber composition for an inner liner comprises silica from the viewpoint of achievement of both satisfactory rubber strength and excellent energy efficiency and it is further preferable that the rubber composition for an inner liner comprises n (n is an integer of 2 or more) kinds of silica having a different BET specific surface area.

Examples of the silica include silica prepared by dry process (silicic anhydride), silica prepared by wet process (hydrous silicic acid) and the like. The silica prepared by wet process is preferable because it has more silanol groups on its surface and has many reaction points with a silane coupling agent.

The BET specific surface area of silica is preferably not less than 50 m$^2$/g, more preferably not less than 60 m$^2$/g, since a sufficient reinforcing effect of silica can be obtained. On the other hand, the BET specific surface area of silica is preferably not more than 350 m$^2$/g, more preferably not more than 340 m$^2$/g, since dispersion of silica is satisfactory and energy efficient is excellent. It is noted that the BET specific surface area of silica in the specification of the instant application is a value as measured with the BET method in accordance with ASTM D3037-81.

When the rubber composition for an inner liner comprises silica, the content thereof based on 100 parts by mass of the rubber component is preferably 10 to 40 parts by mass, more preferably 12 to 38 parts by mass from the viewpoint of achievement of both excellent energy efficiency and satisfactory rubber strength.

When the rubber composition for an inner liner comprises n (n is an integer of 2 or more) kinds of silica, it is preferable that the content thereof and the BET specific surface area satisfy the following formulas (6) and (7):

$$10 < X1 + X2 + \ldots + Xn < 40 \qquad \text{Formula (6):}$$

$$0.20 < X1/Y1 + X2/Y2 + \ldots + Xn/Yn < 0.30, \qquad \text{Formula (7):}$$

wherein each of X1, X2, . . . Xn represents a content (part by mass) of each silica based on 100 parts by mass of a rubber component and each of Y1, Y2, . . . Yn represents a BET specific surface area (m$^2$/g) of each silica.

The X1+X2+ . . . +Xn in the formula (6) represents a total content (part by mass) of each of n types of silica based on 100 parts by mass of the rubber component. When the rubber composition for an inner liner comprises n kinds of silica, the total content of n kinds of silica based on 100 parts by mass of the rubber component preferably exceeds 10 parts by mass, and is more preferably not less than 20 parts by mass, further preferably not less than 25 parts by mass, further preferably not less than 30 parts by mass, most preferably not less than 35 parts by mass. On the other hand, the total content of n kinds of silica is preferably less than 40 parts by mass. By the total content of n kinds of silica being within the above range, that is, by the total content of n kinds of silica satisfying the formula (6), both satisfactory rubber strength and excellent energy efficiency can be achieved.

The X1/Y1+X2/Y2+ . . . +Xn/Yn in the formula (7) represents a sum of "content based on 100 parts by mass of the rubber component/BET specific surface area" of each of n kinds of silica. When the rubber composition for an inner liner comprises n kinds of silica, a value of the sum in the formula (7) preferably exceeds 0.20 and is preferably not less than 0.21, more preferably not less than 0.22. On the other hand, the sum in the formula (7) is preferably less than 0.30. By the sum of "content based on 100 parts by mass of the rubber component/BET specific surface area" of each silica satisfying the formula (7), energy efficiency, breaking resistance and flexing resistance can be improved in a favorable balance.

From the viewpoint of reinforcing property and antistatic property, it is preferable that the rubber composition for an inner liner comprises carbon black as a reinforcing filler. Examples of carbon black include ones generally used in the tire industry such as GPF, HAF, ISAF, SAF and these carbon black may be used alone, or may be used in combination with two or more thereof.

The nitrogen adsorption specific surface area (N$_2$SA) of the carbon black is preferably not less than 10 m$^2$/g, more preferably not less than 20 m$^2$/g, since sufficient reinforcing property can be obtained. On the other hand, the N$_2$SA of the carbon black is preferably not more than 200 m$^2$/g, more preferably not more than 150 m$^2$/g, further preferably not more than 100 m$^2$/g, further preferably not more than 80 m²/g, most preferably not more than 50 m²/g. The $N_2SA$ of the carbon black is a value as measured in accordance with JIS K6217, method A.

When the rubber composition for an inner liner comprises carbon black, the content thereof based on 100 parts by mass of the rubber component is preferably not less than 1 part by mass, more preferably not less than 3 parts by mass from the viewpoint of weather resistance, antistatic property and improvement of rubber strength. On the other hand, from the viewpoint of energy efficiency, the content of the carbon black is preferably not more than 20 parts by mass, more preferably not more than 15 parts by mass.

Examples of the coupling agent include a silane coupling agent and the like and when the rubber composition for an inner liner comprises silica, it is preferable that a silane coupling agent is used together with silica. Any silane coupling agents conventionally used together with silica can be used, and examples thereof include: sulfide silane coupling agents such as bis(3-triethoxysilylpropyl)tetrasulfide, bis(2-triethoxysilylethyl)tetrasulfide, bis(4-triethoxysilylbutyl)tetrasulfide, bis (3-trimethoxysilylpropyl)tetrasulfide, bis (2-trimethoxysilylethyl)tetrasulfide, bis(4-trimethoxysilylbutyl)tetrasulfide, bis(3-triethoxysilylpropyl)trisulfide, bis (2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, 2-mercaptoethyltriethoxysilane, and 3-octanoylthio-1-propyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane, and chloro silane coupling agents such as 3-chloropropyltrimethoxysilane, 3-chloropropyltriethoxysilane, 2-chloroethyltrimethoxysilane, and 2-chloroethyltriethoxysilane. As to product names of these silane coupling agents, examples include Si69, Si266, Si363 (manufactured by Evonik Degussa GmbH) and NXT, NXT-LV, NXTULV, NXT-Z (manufactured by Momentive Performance Materials INC.) and the like. These coupling agents may be used alone, or may be used in combination with two or more thereof.

When the rubber composition for an inner liner comprises a silane coupling agent, the content thereof based on 100 parts by mass of silica is preferably not less than 0.5 part by mass, more preferably not less than 1.5 parts by mass, further preferably not less than 2.5 parts by mass, since the silica can be dispersed well. On the other hand, the content of the silane coupling agent is preferably not more than 20 parts by mass, more preferably not more than 15 parts by mass, further preferably not more than 10 parts by mass, since a dispersing effect of silica that is compatible with an increase of the cost can be obtained and a scorch time does not become too short and processability in a kneading process and an extruding process is satisfactory.

Examples of the semi-reinforcing filler include bituminous coal powder, talc (a common talc that is not a flat talc, a flat talc), mica, hard clay and the like and these may be used alone, or may be used in combination with two or more thereof. Since these semi-reinforcing fillers do not form polymer gel in a kneading process, satisfactory sheet processability can be obtained by the rubber composition for an inner liner comprising these semi-reinforcing fillers. Among these, from the viewpoint of sheet processability and cost, bituminous coal powder, a common talc and hard clay are preferable and from the viewpoint of air permeation resistance, mica having a large rate of the flat and a flat talc are preferable.

The average particle diameter of the talc is preferably not more than 50 μm, more preferably not more than 30 μm from the viewpoint of energy efficiency. The lower limit of the average particle diameter of the talc is not limited particularly, but preferably is not less than 1 μm.

The average particle diameter of the mica is preferably not more than 50 μm, more preferably not more than 30 μm from the viewpoint of energy efficiency. The lower limit of the average particle diameter of the mica is not limited particularly, but preferably is not less than 1 μm.

The average particle diameter of the hard clay is preferably not more than 50 μm, more preferably not more than 30 μm from the viewpoint of energy efficiency. The lower limit of the average particle diameter of the hard clay is not limited particularly, but preferably is not less than 1 μm.

It is noted that in the specification of the instant application, the average particle diameter of the semi-reinforcing filler is an average particle diameter on a mass basis as determined from a particle size distribution as measured in accordance with JIS Z 8815-1994.

When the rubber composition for an inner liner comprises the semi-reinforcing filler, the content thereof (if used in combination, the total content) based on 100 parts by mass of the rubber component is preferably not less than 3 parts by mass, more preferably not less than 8 parts by mass from the viewpoint of sheet processability and air permeation resistance. On the other hand, the content of the semi-reinforcing fillers is preferably not more than 45 parts by mass, more preferably not more than 40 parts by mass since sufficient elongation at break can be obtained.

The plasticizer is not limited particularly, but from the viewpoint of achievement of both satisfactory rubber strength and excellent energy efficiency, it is preferable that the rubber composition for an inner liner substantially comprises no aroma oil and mineral oil, and it is more preferable that the rubber composition for an inner liner comprises no aroma oil and mineral oil (0 part by mass). The meaning of to substantially comprise no aroma oil and mineral oil is that the content of aroma oil and/or mineral oil based on 100 parts by mass of the rubber component is not more than 10 parts by mass.

It is preferable to use a plasticizer other than aroma oil and mineral oil as the plasticizer. A liquid polymer, a liquid resin, plant-derived oil, an ester plasticizer and the like may be used as the plasticizer other than aroma oil and mineral oil and among these, an ester plasticizer is preferable from the viewpoint of energy efficiency and processability. Examples of the ester plasticizer include dibutyl adipate (DBA), diisobutyl adipate (DIBA), dioctyl adipate (DOA), di(2-ethyl hexyl) azelate (DOZ), dibutyl sebacate (DBS), diisononyl adipate (DINA), dietyl phthalate (DEP), dioctyl phthalate (DOP), diundecyl phthalate (DUP), dibutyl phthalate (DBP), bis(2-ethyl hexyl)sebacate (DOS), tributyl phosphate (TBP), trioctyl phosphate (TOP), triethyl phosphate (TEP), trimethyl phosphate (TMP), thymidine triphosphate (TTP), tricresyl phosphate (TCP), trixylenyl phosphate (TXP) and the like and DOS is preferable since energy efficient is excellent.

When the rubber composition for an inner liner comprises a plasticizer, the content thereof based on 100 parts by mass of the rubber component is preferably not less than 3 parts by mass, more preferably not less than 4 parts by mass from the viewpoint of achievement of both excellent energy efficiency and satisfactory processability. On the other hand, the content of the plasticizer is preferably not more than 40 parts by mass, more preferably not more than 35 parts by mass, since a decrease of the rubber strength is prevented.

Examples of the vulcanization accelerator include benzothiazols, benzothiazolyl sulfenamides, benzothiazolyl sulfenimides and the like. Among these, N-tert-butyl-2-benzothiazolyl sulfenimide (TBSI) is preferable from the viewpoint of excellent vulcanizing property and concerns for the environment. While the benzothiazolyl sulfenimides and other vulcanization accelerators may be used in combination as the vulcanization accelerator, it is preferable to use benzothiazolyl sulfenimides alone from the viewpoint of achievement of both excellent energy efficiency and satisfactory rubber strength.

When the rubber composition for an inner liner comprises benzothiazolyl sulfenimides as the vulcanization accelerator, the content thereof based on 100 parts by mass of the rubber component is preferably not less than 0.5 part by mass, more preferably not less than 1.0 part by mass, further preferably not less than 1.5 parts by mass since a vulcanization speed becomes appropriate and vulcanization can be sufficiently performed. On the other hand, the content of the benzothiazolyl sulfenimides is preferably not more than 4.0 parts by mass, more preferably not more than 3.0 parts by mass since the vulcanization speed becomes appropriate and scorching is hardly arisen.

The production method of the rubber composition for an inner liner of the present invention is not limited particularly and can be prepared by a commonly used method. For example, each of the above components are kneaded with a rubber kneading machine such as an open roll, a Bunbury mixer, a sealed kneader and the like, and subsequently the kneaded product is vulcanized, whereby the rubber composition for an inner liner can be prepared.

The rubber composition for an inner liner of the present invention is used for, for example, an inner liner shown in JP 2008-291091 A, FIG. 1 and an inner liner shown in JP 2007-160980 A, FIGS. 1 and 2.

The tire of the present invention can be produced by a commonly used method using the rubber composition for an inner liner of the present invention. That is, a predetermined rubber composition is molded by extrusion into the shape of an inner liner, molded in a tire building machine with other components of the tire to form an unvulcanized tire. This unvulcanized tire is then heat-pressurized in a vulcanizer to obtain the tire of the present invention.

The tire of the present invention can be suitably used for tires for passenger vehicles, tires for busses and trucks, tires for motorcycles, tires for racing and the like, and is particularly suitably used as tires for passenger vehicles.

EXAMPLES

Hereinafter, the present invention will be described in more detail based on Examples, but the present invention is not limited thereto only.

A variety of chemicals used in Examples and Comparative Examples will be described.

ENR 25: epoxidized natural rubber manufactured by Kumpulan Guthrie Berhad (Malaysia) (epoxidation rate: 25 mol %)

ENR 5: ENR produced in the following production example (epoxidation rate: 5 mol %)

NR: TSR20

Chlorobutyl rubber: chlorobutyl HT1066 manufactured by Exxon Mobil Corporation

Silica 1: ZEOSIL 115GR manufactured by Rhodia Inc. (BET: 112 $m^2/g$)

Silica 2: Ultrasil VN3 manufactured by Evonik Degussa GmbH (BET: 210 $m^2/g$)

Carbon black: ShoBlack N550 ($N_2$SA: 40 $m^2/g$) produced by Cabot Japan K. K.

Mica: Mica (phlogopite) S-200HG (phlogopite, average particle diameter: 50 μm, aspect ratio: 55) manufactured by REPCO Inc.

Silane coupling agent 1: Si266 (bis(3-triethoxysilylpropyl) disulfide) manufactured by Evonik Degussa GmBH Silane coupling agent 2: NXT (3-octanoylthio-1-propyltriethoxysilane) manufactured by Momentive Performance Materials INC.

Ester plasticizer: SANSOCIZER DOS di(2-ethyl hexyl) sebacate) manufactured by New Japan Chemical Co., Ltd.

Liquid polymer: LIR-410 manufactured by KURARAY CO., LTD.

Mineral oil: Diana Process Oil PA32 manufactured by Idemitsu Kosan Co., Ltd.

Anti-aging agent 1: Nocrack 6C (N-(1,3-dimethylbutyl)-N-phenyl-p-phenylene diamine, 6PPD) manufactured by Ouchi Shinko Chemical Industrial Co., Ltd.

Anti-aging agent 2: Nocrack 224 (2,2,4-trimethyl-1, 2-dihydroquinoline polymer, TMQ) manufactured by Ouchi Shinko Chemical Industrial Co., Ltd.

Calcium stearate: calcium stearate manufactured by NOF CORPORATION

Stearic acid: Stearic acid "Tsubaki" manufactured by NOF CORPORATION

Zinc oxide: zinc oxide #2 manufactured by Mitsui Mining 86 Smelting Co., Ltd.

Sulfur: sulfur powder manufactured by TSURUMI CHEMICAL INDUSTRY CO., LTD.

Vulcanization accelerator 1: SANTOCURE TBSI (N-tert-butyl-2-benzothiazolyl sulfenimide, TBSI) manufactured by FlexSys Inc.

Vulcanization accelerator 2: Nocceler NS (N-tert-butyl-2-benzothiazylsulfeneamide, TBBS) manufactured by OUCHI SHINKO CHEMICAL INDUSTRIAL CO., LTD.

SIBS: SIBSTAR 102 (a styrene-isobutylene-styrene triblock copolymer) manufactured by KANEKA CORPORATION PA: UBESTA XPA 9040 (polyamide polymer) manufactured by Ube Industries, Ltd.

Production of ENR5

A 1750 g of high ammonia type, natural rubber latex (Hytex available from Nomura Trading Co., Ltd., solid content 60%) was put in a 5-liter glass container, stirred with a stirring blade and diluted by adding 1500 g of diluted water so that the solid content becomes 30%. A 21 g of nonionic emulsifier (EMULGEN 106 manufactured by Kao Corporation) was added while being stirred. Then, a 108 g of hydrogen peroxide (hydrogen peroxide manufactured by Wako Pure Chemical Industries, Ltd., first grade reagent, active ingredient: 35%) and a 115 g of acetic anhydride (acetic anhydride manufactured by Wako Pure Chemical Industries, Ltd., first grade reagent, active ingredient: 93%) were reacted in another container to prepare peracetic acid and the prepared peracetic acid was slowly added into the 5-liter glass container. After addition, the mixture was reacted for 30 minutes at room temperature, neutralized with ammonia (ammonia water manufactured by Wako Pure Chemical Industries, Ltd., first grade reagent, active ingredient: 25%) and only a rubber component was coagulated with methanol. After that, the mixture was washed with tap water and dried to prepare ENR5. The epoxidation rate of the obtained ENR5 was 5 mol %.

Measurement of Epoxidation Rate (unit: mol %)

The obtained dried rubber (ENR) was dissolved in deuterated chloroform and the epoxidation rate was calculated by the following calculation formula from a ratio of a value of integral h of a carbon-carbon double bond part and an aliphatic part, in accordance with a nuclear magnetic resonance spectroscopy analysis using a NMR (JNM-ECA series manufactured by JEOL Ltd.).

$$\text{Epoxidation rate (mol \%)} = 3 \times h(2.69)/(3 \times h(2.69) + 3 \times h(5.14) + h(0.87)) \times 100$$

Examples 1 to 7 and Comparative Examples 1 and 2

According to formulations shown in Tables 1 and 2, all of the chemicals other than sulfur and vulcanization accelerators were kneaded for five minutes with a 1.7 L Banbury mixer at the compound temperature at the time of discharge from mixer of 150° C. to obtain a kneaded product. Then, sulfur and the vulcanization accelerators were added to the obtained kneaded product with an open roll and the mixture was kneaded for three minutes to obtain an unvulcanized rubber composition. The obtained unvulcanized rubber composition was press-vulcanized under a condition of 150° C. for 30 minutes to obtain a vulcanized rubber sheet for test.

Comparative Example 3

The polymer mixture and softener in accordance with the formulation shown in Table 1 were put into a revolving rotor (100 rpm, length: 1 m) of an injection press and blended. A mold of 13 cm×13 cm×thickness: 2 mm was attached to the press and the mixture was extruded under a condition of a mold head pressure of 100 kgf, a head temperature of 220° C., an injection speed of 80 mm/second, a number of revolutions of the rotor of 100 rpm to prepare a resin sheet of Comparative Example 3.

The obtained each unvulcanized rubber composition or rubber sheet was molded into the shape of an inner liner, laminated with other components of the tire in a tire building machine and press-vulcanized for 30 minutes under a condition of 150° C. to obtain tires for test (tire size: 195/65R15).

Evaluation by methods described below was performed using the obtained vulcanized rubber sheets for test, the resin sheet and the tires for test. The evaluation results are shown in Tables 1 and 2.

<Viscoelasticity Test>

A dynamic elastic modulus E* and a loss tangent tan δ of each vulcanized rubber sheet for test and the resin sheet were measured under a condition at 70° C., a frequency of 10 Hz, an initial strain of 10%, and a dynamic strain of 2% using a viscoelastic spectrometer VES manufactured by Iwamoto Seisakusho K.K. The value of E*/tan δ in the formula (1) was calculated from the obtained value.

<Air Permeation Coefficient>

Air permeation of each vulcanized rubber sheet for test and the resin sheet was measured in accordance with a ASTM D-1434-75M method and air permeation coefficients were calculated. The smaller the air permeation coefficient is, the more excellent the air permeation resistance is.

<Tensile Test>

According to JIS K6251 "vulcanized rubber and thermoplastic rubber—calculation of tensile characteristics", a tensile test was conducted using a No. 3 dumbbell type test piece comprising each of the vulcanized rubber sheets for test and the resin sheet, and an elongation at break EB and a tensile strength at break TB of each of the vulcanized rubber sheets for test and the resin sheet were measured. The value of TB×EB was calculated from the obtained value.

<Measurement of Rubber Hardness HS>

According to JIS K6253, a rubber hardness Hs of each vulcanized rubber sheet for test and the resin sheet at a temperature of 23° C. was measured with a durometer type A.

<Steering Stability Test>

Each of the test tires was loaded on a domestically produced FF vehicle of 2000 cc on the whole wheel, followed by a test running on a test course. The steering stability under meandering immediately after the start of the test and after 30 minutes from the start of the test was evaluated by a sensorial evaluation of a driver. The evaluation was comprehensively and relatively evaluated, regarding the steering stability of Comparative Example 1 as 100. The higher the score is, the more excellent the steering stability is.

<Tire Durability Test>

Each of the test tires were assembled to a JIS standard rim of 15×6JJ, followed by running on a drum having a diameter of 1707 mm at room temperature (38° C.) at a speed of 80 km/h, under conditions of an air pressure of 150 kPa and a load of 6.96 kN. In the case where a crack inside the inner liner, an air leak due to peeling or an inflation on the appearance of the sidewall is arisen, the running was stopped. A distance at which the inflation was arisen was measured and durability of the tires was evaluated by the following evaluation basis. The targeted level of performance is at least ○.

○: The inflation was not arisen in the side wall even if the tire was run for 30,000 km or more.

Δ: The inflation was arisen in the side wall at the running distance of 10,000 km to less than 30,000 km.

x: The inflation was arisen in the side wall at the running distance of less than 10,000 km.

<Air Retention Property of Tire>

Each of the test tires were assembled to a JIS standard rim of 15×6JJ, into which an initial air pressure of 300 kPa was encapsulated and the test tires were allowed to stand for 90 days at room temperature. Then, the decrease rate (%) of the air pressure was measured and a decrease rate of air pressure per month (%/month) was calculated. Air retention property of the tires was evaluated by the following evaluation basis. The targeted level of performance is at least ∘.

∘∘: 4%/month or less
∘: more than 4%/month and 5%/month or less
x: more than 5%/month <Index of Energy Efficiency>

Rolling resistance of each test tire when each tire was run under conditions of a rim (15×6JJ), an inner pressure (230 kPa), a load (3.43 kN) and a speed (80 km/h) was measured with a rolling resistance testing machine and results are shown by index, regarding the result of Comparative Example 1 as 100. The larger the index of energy efficiency is, the more excellent the energy efficiency is.

TABLE 1

|  | Example | | Comparative Example | | |
|---|---|---|---|---|---|
|  | 1 | 2 | 1 | 2 | 3 |
| Compounding amount (part by mass) | | | | | |
| ENR25 | 100 | — | — | 100 | — |
| ENR5 | — | 100 | — | — | — |
| NR | — | — | 20 | — | — |
| Chlorobutyl rubber | — | — | 80 | — | — |
| Silica 1 | 15 | 15 | — | 40 | — |
| Silica 2 | 20 | 20 | — | — | — |
| Carbon black | 8 | 2 | 45 | — | — |
| Mica | — | 10 | — | — | — |
| Coupling agent 1 | 2.5 | — | — | 2.5 | — |
| Coupling agent 2 | — | 2.5 | — | — | — |
| Ester plasticizer | 4 | — | — | — | — |
| Liquid polymer | — | 5 | — | — | — |
| Mineral oil | — | — | 9 | 2 | — |
| Anti-aging agent 1 | 2 | 2 | 2 | 2 | — |
| Anti-aging agent 2 | 2 | 2 | 2 | 2 | — |
| Calcium stearate | 2 | 1 | — | 1 | — |
| Stearic acid | 1.5 | 1.5 | 1.5 | 1.5 | — |
| Zinc oxide | 2 | 2 | 2 | 2 | — |
| Sulfur | 1.5 | 1.5 | 0.6 | 1.5 | — |
| Vulcanization accelerator 1 | 1.5 | 1.5 | — | — | — |
| Vulcanization accelerator 2 | — | — | 1.5 | 1.5 | — |
| SIBS | — | — | — | — | 90 |
| PA | — | — | — | — | 10 |
| Evaluation result | | | | | |
| tanδ (formula (3)) | 0.129 | 0.115 | 0.248 | 0.141 | 0.203 |
| E* (MPa) (formula (2)) | 2.89 | 3.02 | 2.62 | 2.35 | 3.01 |
| TB (MPa) | 25.0 | 25.0 | 6.8 | 19.8 | 10.2 |
| EB (%) (formula (4)) | 600 | 620 | 630 | 605 | 600 |
| Formula (1) | 22.4 | 26.3 | 10.6 | 16.7 | 14.8 |
| Formula (5) | 15000 | 15500 | 4275 | 12000 | 6100 |
| Formula (6) | 35 | 35 | — | 40 | — |
| Formula (7) | 0.23 | 0.23 | — | 0.36 | — |
| Air permeation coefficient × $10^{-14}$(cm$^3$·cm/(cm$^2$·s·Pa)) | 11.70 | 8.03 | 9.38 | 11.70 | 3.00 |
| Rubber hardness (Hs) | 48 | 50 | 48 | 50 | 45 |
| Steering stability | 110 | 120 | 100 | 90 | 100 |
| Tire durability | ∘ | ∘ | ∘ | ∘ | x |
| Air retention property | ∘ | ∘∘ | ∘ | ∘ | ∘∘ |
| Index of energy efficiency | 108 | 110 | 100 | 105 | 97 |

TABLE 2

|  | Example | | | | |
|---|---|---|---|---|---|
|  | 3 | 4 | 5 | 6 | 7 |
| ompounding amount (part by mass) | | | | | |
| ENR25 | 100 | 80 | 100 | 20 | 100 |
| ENR5 | — | — | — | — | — |
| NR | — | — | — | 80 | — |
| Chlorobutyl rubber | — | 20 | — | — | — |
| Silica 1 | — | 15 | 15 | 15 | 15 |
| Silica 2 | 35 | 20 | 20 | 20 | 20 |
| Carbon black | 8 | 8 | 8 | 8 | 8 |
| Mica | — | — | — | — | — |
| Coupling agent 1 | 2.5 | 2.5 | 2.5 | 2.5 | 2.5 |
| Coupling agent 2 | — | — | — | — | — |

TABLE 2-continued

|  | Example | | | | |
| --- | --- | --- | --- | --- | --- |
|  | 3 | 4 | 5 | 6 | 7 |
| Ester plasticizer | 4 | 4 | — | 4 | 4 |
| Liquid polymer | — | — | — | — | — |
| Mineral oil | — | — | 4 | — | — |
| Anti-aging agent 1 | 2 | 2 | 2 | 2 | 2 |
| Anti-aging agent 2 | 2 | 2 | 2 | 2 | 2 |
| Calcium stearate | 2 | 2 | 2 | 2 | 2 |
| Stearic acid | 1.5 | 1.5 | 1.5 | 1.5 | 1.5 |
| Zinc oxide | 2 | 2 | 2 | 2 | 2 |
| Sulfur | 1.5 | 1.5 | 1.5 | 1.5 | 1.5 |
| Vulcanization accelerator 1 | 1.5 | 1.5 | 1.5 | 1.5 | — |
| Vulcanization accelerator 2 | — | — | — | — | 1.5 |
| SIBS | — | — | — | — | — |
| PA | — | — | — | — | — |
| Evaluation result |  |  |  |  |  |
| tanδ (formula (3)) | 0.134 | 0.143 | 0.129 | 0.120 | 0.131 |
| E* (MPa) (formula (2)) | 3.08 | 3.48 | 2.80 | 2.60 | 2.93 |
| TB (MPa) | 25.4 | 23.0 | 22.6 | 25.4 | 23.3 |
| EB (%) (formula (4)) | 595 | 610 | 620 | 610 | 600 |
| Formula (1) | 23.0 | 24.3 | 21.7 | 21.7 | 22.4 |
| Formula (5) | 15100 | 14000 | 14000 | 15500 | 14000 |
| Formula (6) | — | 35 | 35 | 35 | 35 |
| Formula (7) | — | 0.23 | 0.23 | 0.23 | 0.23 |
| Air permeation coefficient × $10^{-14}$(cm$^3$ · cm/(cm$^2$ · s · Pa)) | 11.60 | 10.10 | 11.90 | 11.90 | 11.70 |
| Rubber hardness (Hs) | 49 | 49 | 48 | 47 | 48 |
| Steering stability | 110 | 110 | 109 | 107 | 109 |
| Tire durability | ○ | ○ | ○ | ○ | ○ |
| Air retention property | ○ | ○ | ○ | ○ | ○ |
| Index of energy efficiency | 107 | 105 | 108 | 110 | 108 |

From the results of Tables 1 and 2, it can be seen that a tire having an inner liner composed of a rubber composition for an inner liner which comprises a rubber component and additives, wherein a dynamic elastic modulus E* (MPa) and a loss tangent tan δ measured at a temperature of 70° C., an initial strain of 10% and a dynamic strain of 2% satisfy predetermined formulas, an air permeation coefficient is within a predetermined range, and a tensile strength at break TB (MPa) and an elongation at break EB (%) as measured in accordance with JIS K6251 satisfy predetermined formulas, is excellent in steering stability, energy efficiency and a balance of physical properties, while maintaining air permeation resistance and tire durability.

What is claimed is:

1. A tire having an inner liner composed of a rubber composition for an inner liner which comprises a rubber component and additives,
    wherein a dynamic elastic modulus E* (MPa) and a loss tangent tanδ measured at a temperature of 70° C., an initial strain of 10% and a dynamic strain of 2% satisfy the following formulas (1) to (3),
    an air permeation coefficient is not more than 12.00×10$^{-14}$ cm$^3$·cm/(cm$^2$·s·Pa), and
    a tensile strength at break TB (MPa) and an elongation at break EB (%) as measured in accordance with JIS K6251 satisfy the following formulas (4) and (5):

$E^*/\tan\delta > 17$      Formula (1):

$2.5 < E^* < 5$      Formula (2):

$\tan\delta < 0.15$      Formula (3):

$EB > 450$      Formula (4):

$TB \times EB > 10{,}000$;      Formula (5):

and further wherein the additives comprise carbon black of 1 to 20 parts by mass based on 100 parts by mass of the rubber component.

2. The tire of claim 1, wherein a rubber hardness Hs at 23° C. as measured in accordance with a JIS-K6253 type A method of the rubber composition is not more than 60.

3. The tire of claim 1, wherein the additives comprise silica.

4. The tire of claim 1, wherein the additives comprise n (n is an integer of 2 or more) kinds of silica and a content and a BET specific surface area of silica satisfy the following formulas (6) and (7):

$10 < X1 + X2 + \ldots + Xn < 40$      Formula (6):

$0.20 < X1/Y1 + X2/Y2 + \ldots + Xn/Yn < 0.30$,      Formula (7):

wherein each of X1, X2, ... Xn represents a content (part by mass) of each silica based on 100 parts by mass of a rubber component and each of Y1, Y2, ... Yn represents a BET specific surface area (m$^2$/g) of each silica.

5. The tire of claim 1, wherein the rubber component substantially comprises no butyl-based rubber.

6. The tire of claim 1, wherein the rubber component comprises 50% by mass or more of a diene rubber having a functional group that has affinity with silica in its main chain.

7. The tire of claim 1, wherein the additives comprise benzothiazolyl sulfenimide.

8. The tire of claim 1, wherein the rubber composition for the inner liner comprises no aroma oil and mineral oil.

* * * * *